(12) United States Patent
Jallouli et al.

(10) Patent No.: US 9,477,099 B2
(45) Date of Patent: Oct. 25, 2016

(54) TRANSPARENT OPTICAL ELEMENT WITH DUAL LIGHT-POLARIZING EFFECT

(71) Applicant: Essilor International (Compagnie Generale D'Optique), Charenton le Pont (FR)

(72) Inventors: Aref Jallouli, Shrewsbury, MA (US); Philip Miller, Dallas, TX (US); Haifeng Shan, Shrewsbury, MA (US)

(73) Assignee: Essilor International (Compagnie Generale D'Optique), Charenton le Pont (FR)

( * ) Notice: Subject to any disclaimer, the term of this patent is extended or adjusted under 35 U.S.C. 154(b) by 181 days.

(21) Appl. No.: 13/683,867

(22) Filed: Nov. 21, 2012

(65) Prior Publication Data

US 2014/0139802 A1 May 22, 2014

(51) Int. Cl.
*G02C 7/00* (2006.01)
*G02C 7/12* (2006.01)
*G02B 5/30* (2006.01)

(52) U.S. Cl.
CPC .............. *G02C 7/12* (2013.01); *G02B 5/3041* (2013.01); *G02B 5/3083* (2013.01)

(58) Field of Classification Search
CPC ........ G02B 1/08; G02B 5/30; G02B 5/3033; G02B 5/3041; G02B 5/305; G02B 5/3083; G02B 5/32; G02B 27/26; G02B 27/28; G02B 27/288; G02B 2006/12116; G02C 7/12; H04N 13/0434

USPC ............ 351/49, 159.56; 359/485.03, 485.04, 359/489.01
See application file for complete search history.

(56) References Cited

U.S. PATENT DOCUMENTS

| | | | |
|---|---|---|---|
| 4,981,342 A * | 1/1991 | Fiala | A61F 2/1618 351/159.05 |
| 5,142,411 A * | 8/1992 | Fiala | 359/489.18 |
| 7,597,442 B2 | 10/2009 | Biver et al. | |
| 2005/0099588 A1 | 5/2005 | Helpern et al. | |
| 2006/0182896 A1* | 8/2006 | Murakami | B29C 55/026 428/1.1 |
| 2008/0143926 A1* | 6/2008 | Amimori | G02B 5/3083 349/75 |
| 2010/0091205 A1* | 4/2010 | Wu et al. | 349/15 |
| 2011/0286095 A1 | 11/2011 | Merrill et al. | |
| 2013/0321758 A1* | 12/2013 | Collett | 351/49 |

* cited by examiner

*Primary Examiner* — Ricky Mack
*Assistant Examiner* — Gary O'Neill
(74) *Attorney, Agent, or Firm* — Seed IP Law Group PLLC (57) ABSTRACT

A transparent optical element with dual light-polarizing effect comprises a first film forming a linear light-polarizer in a first surface portion of the element, and a second film forming a retarder plate within a second surface portion. The second surface portion is contained in the first surface portion. Such element may form an eyeglass adapted for providing stereoscopic vision by light polarization selection in the second surface portion, while providing protection against excessive light intensity in the first surface portion.

31 Claims, 4 Drawing Sheets

TRANSPARENT OPTICAL ELEMENT WITH DUAL LIGHT-POLARIZING EFFECT

BACKGROUND

1. Technical Field

The invention relates to a transparent optical element which is provided with dual light-polarizing effect, and also to a process for manufacturing such transparent optical element. It may be implemented in particular to ophthalmic applications.

2. Description of the Related Art

Spectacle eyeglasses which are provided with linear light-polarizers are well known, in particular sunglasses. For example, such spectacle eyeglasses are adapted for reducing or suppressing glaring light produced by reflecting surfaces oriented either vertically or horizontally. Thus, wearing such eyeglasses which are provided with horizontally oriented linear light-polarizers, suppressing vertically oriented polarized light, allows car-driving in city environment without being dazzled by light reflected on shopfront glazings. In another example, eyeglasses which are provided with vertically oriented linear light-polarizers, suppressing horizontally oriented polarized light, allow vision through the water surface of a lake, because light reflected from the water surface at Brewster incidence value is suppressed by the polarizer. Such latter eyeglasses also reduce light reflected by snow as perceived by skiers, or light reflected on road surfaces.

But conditions exist where eyeglasses provided with linear light-polarizers hinder the wearer from seeing some elements and perceiving the corresponding visual information. For example, light produced by liquid crystal display is commonly polarized, and wearing eyeglasses which are provided with polarizers capable of suppressing polarized light of the same type may make it impossible to read the display under certain circumstances. This may be especially harmful for drivers when polarizing sunglasses hinder from reading driving information displayed on an electronic dashboard of the car. In other cases, people relying on such display may not be able to see the information while having a direct line-of-sight with it, or even while keeping it in one's hand if the polarized light emitted by it has a wrong orientation with regard to the glasses' polarization axis.

Then, an object of the present invention consists in providing transparent optical elements which do not have such drawbacks, while still providing protection against dazzling.

Another object of the invention consists in providing transparent optical elements which are adapted for being efficient with variable light polarization conditions. More particularly, optical elements according to the invention allow seeing objects producing light with different polarization features without changing the head position.

BRIEF SUMMARY

In order to meet at least some of these objects or others, a first aspect of the present invention proposes a transparent optical element with dual light-polarizing effect, this element having an optical surface and comprising at least first and second films each arranged in parallel with the optical surface. The first film forms a linear light-polarizer in a first portion of the optical surface, and the second film forms a retarder plate in a second portion of the optical surface. Within the optical surface, the second portion is smaller than the first portion and is contained within this first portion. Then, a retarder efficiency of the second film is higher in the second portion with respect to the first portion out of said second portion.

Thus, the first portion of the optical surface of a transparent optical element in accordance with the present invention is divided into two sub-portions which are complementary to each other: the second portion with high retarder efficiency of the second film, and the remaining part of the first portion where the retarder efficiency is lower or zero. The linear light-polarizing effect of the first film exists in both the second portion and the remaining part of the first portion of the optical surface. Because of such division of the first portion of the optical surface, and the corresponding variation in the retarder efficiency of the second film, vision conditions can be adapted for avoiding that objects which produce linearly polarized light are completely hindered from being viewed when looking at them through the second portion even when they would be suppressed when looking at them through the first portion out of the second portion.

According to first preferred embodiments of the invention, the second film may extend continuously over the whole first portion of the optical surface, and the retarder efficiency of this second film is lower in the first portion of the optical surface out of the second portion than in the second portion itself. Such structure of the transparent optical element is simpler and easier to manufacture.

A transparent optical element according to the invention may form a finished or semi-finished ophthalmic eyeglass and comprise a base eyeglass, with the first and second films which are laminated on the base eyeglass. Then, the second film is situated before the first film at least in the second portion of the optical surface, along light rays which enter into an eye of a wearer of the eyeglass. Alternatively, a transparent optical element according to the invention may form a layered structure which is suitable for being laminated on an eyeglass.

A second aspect of the present invention proposes a set of paired eyeglasses consisting of right and left eyeglasses suitable for being assembled in a spectacle frame, and at least one of these right and left eyeglasses forms a transparent optical element in accordance with the first invention aspect. In particular, both right and left eyeglasses may be in accordance with this first invention aspect and may comply with the following additional features:

for each one of the eyeglasses, the second film may be situated before the first film at least in the second portion of the optical surface along light rays which enter into the corresponding eye of a wearer of the eyeglass;

the second film may comprise in the second portion of the optical surface a film of a birefringent material with a slow axis and a fast axis both parallel to the second film and perpendicular to each other; and an angle between the polarization direction of light transmitted through the first film and the slow axis may be comprised between 35 and 55 degrees, or between 125 and 145 degrees, in absolute value, meaning that the polarization direction of light transmitted through the first film is angularly offset with respect to each of the slow and fast axes with more than 35 degrees.

Thus, each eyeglass may have a function of circular polarizer for the light which is transmitted through the second portion of the optical surface of this eyeglass, and also a function of linear polarizer for the light transmitted through the first portion of the same optical surface out of the second portion.

Additionally, for one of the right and left eyeglasses, an angle between the polarization direction of light transmitted through the first film and the slow axis of the second film may be selected for forming a right-hand circular polarization filter. Simultaneously, for the other one of the right and left eyeglasses, the angle between the polarization direction of light transmitted through the first film and the slow axis may be selected for forming a left-hand circular polarization filter. Such set of paired eyeglasses is then suitable for providing stereoscopic vision which is produced artificially by circular polarization selection, in the second portions of the optical surfaces to a wearer of such set of paired eyeglasses. However, this set of paired eyeglasses may also be used for functions other than artificially produced stereoscopic vision.

A third aspect of the invention proposes a process for manufacturing a transparent optical element according to the first invention aspect, when the second film extends continuously over the whole first portion of the optical surface, and the retarder efficiency of this second film in the first portion of the optical surface out of the second portion is lower than the retarder efficiency of same second film in the second portion of the optical surface. The invention process then comprises a heating step of the second film using heating parameters which are different in values in the second portion of the optical surface and in the first portion out of this second portion, so that a difference is enabled by these heating parameters between the retarder efficiencies of the second film respectively in the second portion of the optical surface and in the first portion out of the second portion. The heating parameters are at least one of a heating duration and a maximum heating temperature. In preferred implementations of the process of the invention, the first film and the second film may be both comprised in a multilayered structure, and the heating step is applied to the multilayered structure.

In first implementations of the invention process, the second film may be heated and stretched in the second portion of the optical surface, so as to provide this second film with increased birefringence efficiency in the second portion with respect to the first portion of the optical surface out of the second portion.

Alternatively, in second implementations of the invention process, the second film is initially birefringent in the whole first portion of the optical surface, and the second film may be heated in the first portion out of the second portion so that birefringence efficiency becomes reduced in the first portion out of the second portion with respect to this second portion.

Several non-limiting embodiments of the invention are now described in detail, with reference to the drawings appended hereto.

BRIEF DESCRIPTION OF THE SEVERAL VIEWS OF THE DRAWINGS

FIGS. 2a to 2c are cross-sectional views of transparent optical elements each in accordance with FIG. 1a;

FIGS. 5b and 5c represent two heat masks which may be used in the process step illustrated by FIG. 5a.

For sake of clarity, the elements and element components represented in these figures are not sized in relation with actual dimensions, nor with ratios of actual dimensions.

DETAILED DESCRIPTION

Although the description is now focused on ophthalmic applications, the invention is not limited to these applications. It may be applied generally to any transparent optical element for which a combination of a retarder function with a linear polarizing function is to be produced in a limited portion of the element, and the linear polarizing function is to be produced without the retarder function or with a reduced retarder function out of this limited portion. Applications other than spectacle eyeglasses may be front glasses for display panels or dashboards, vision glazings intermediate between a scene and an observer, etc.

Figure 1A:
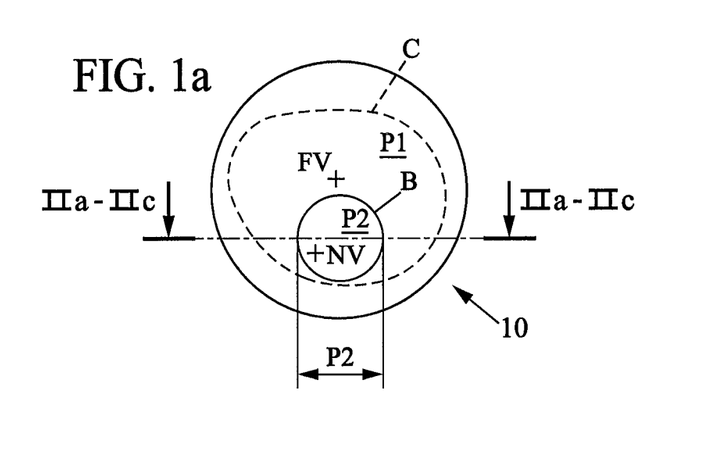
FIGS. 1a to 1d are plan views of transparent optical elements according to the invention.
Figure 1B:
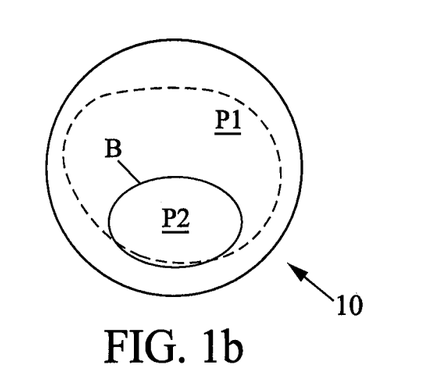
Figure 1C:
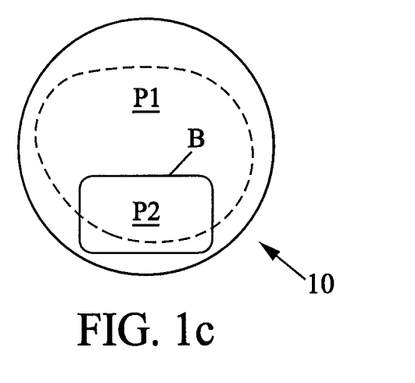
Figure 2A:
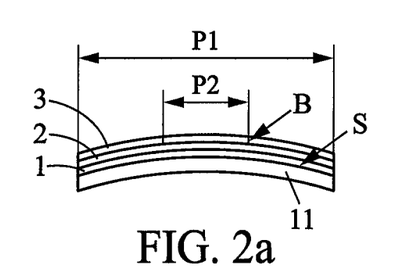
Figure 2B:
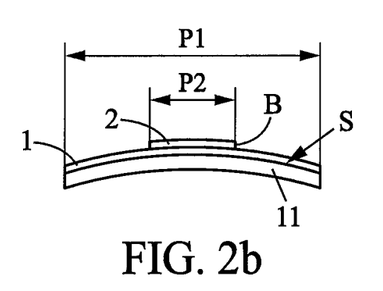
Figure 2C:
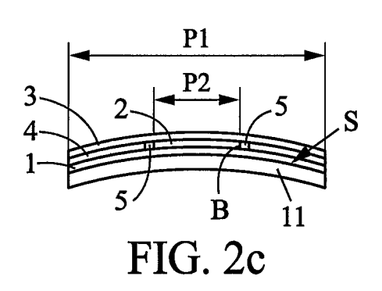

According to FIGS. 1a and 2a, a transparent optical element may be a finished or semi-finished ophthalmic eyeglass 10, which comprises a base eyeglass 11, a first film 1 and a second film 2 which are laminated on the base eyeglass 11. Commonly, a semi-finished ophthalmic eyeglass has a final front surface, referring to the orientation of the eyeglass when worn by a standing wearer, whereas the back surface remains to be machined in a later manufacturing step for obtaining a finished eyeglass. Usually, the back surface is to be machined in accordance with an ophthalmic prescription drawn up for the wearer. Later in this description, vertical and horizontal directions, forward and backward directions as well as upper part and lower part, used in connection with the eyeglass 10 refer to the as-worn orientation of this latter.

The base eyeglass 11 may be itself a finished or semi-finished ophthalmic eyeglass. It may produce any ametropia correction, or it may be devoid of correction, or also a sunglass for providing protection against excessive sun light and subsequent dazzling. The base eyeglass 11 may be of any transparent material used in ophthalmics, of organic, mineral or hybrid composition.

The films 1 and 2 are laminated on an optical surface of the base eyeglass 11, one on top of the other or possibly with intermediate additional films or layers between the films 1 and 2. The second film 2 appears first along a direction perpendicular to the optical surface and oriented from forward to backward of the eyeglass 10, before the first film 1. For example, when the films 1 and 2 are laminated both on the front surface S of the base eyeglass 11, the film 2 is located above the film 1, on a side of this film 1 opposite from the base eyeglass 11. With such configuration, film 1 is closer to the base eyeglass 11 than film 2.

Alternatively, the film 1 may be laminated on the back surface of the base eyeglass 11, and the film 2 on its front surface S.

Alternatively the film 1 and/or the film 2 might be incorporated inside the eyeglass' lens with the condition that the second film is situated before the first film, at least in the second portion of the optical surface, along light rays entering, through the eyeglass, into an eye of a wearer of the eyeglass. Thus film 1 might be incorporated inside the lens' body while film 2 may be laminated on the front surface of the eyeglass.

In that case, one may form an optical object according to the invention by using known semi-finished lenses comprising a linear polarization filter casted or injected inside the lens. Both films may also be present on the back surface of the lens, film 2 being then closer to the lens' body than film 1.

The ophthalmic eyeglass 10 may be intended to be trimmed at its peripheral edge, so as to obtain a peripheral limit which matches the outline C of the spectacle lens' final shape as mounted on a frame.

Figure 1D:
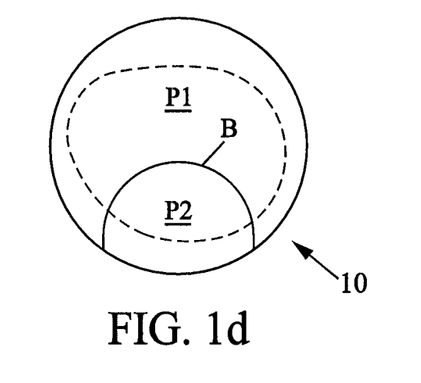

First and second surface portions, respectively P1 and P2, are defined in the optical surface of the eyeglass 10, which corresponds to the front surface S of the base eyeglass 11 in the invention embodiments represented in FIGS. 1a to 3. The portion P2 is smaller that the portion P1 and contained in this latter. Preferably, the portion P1 may contain the whole trimming outline C, and the portion P2 is at least partly contained within the trimming outline C. Portion P1 may correspond to the whole front surface of the eyeglass 10. Reference letter B denotes the peripheral boundary of the portion P2, which bounds the portion P2 with respect to a remaining surface part within the surface portion P1. The configuration of the surface portions P1 and P2 thus defined may have any one of the additional features, separately or in combination of any of them:

- the second portion P2 of the optical surface may be located in a lower part of the eyeglass 10;
- the second portion P2 of the optical surface may be contained below a horizontal line in the optical surface, with a height of this horizontal line from a lower edge of the eyeglass 10 being between 10% and 90% of a total height of the eyeglass measured vertically, preferably between 25% and 75% of this total height;
- the second portion P2 of the optical surface may contain a focal point NV of the eyeglass 10 for near vision, and may exclude a focal point FV of the eyeglass 10 for far vision; and
- a shape of the peripheral boundary B may be circular (FIG. 1a), oval (FIG. 1b), rectangular (FIG. 1 c) or of inverted U-shape (FIG. 1d).

The film 1 extends at least over the whole surface portion P1 (FIGS. 2a-2c), whereas the film 2 extends at least over the whole surface portion P2. The film 2 may be either limited within the surface portion P2, i.e. limited by the boundary B (FIGS. 2b and 2c), or may extend from inside to beyond the boundary B. Possibly, the film 2 may extend over the whole surface portion P1 too (FIG. 2a).

The first film 1 forms a linear light-polarizer in the first portion P1 of the optical surface of the eyeglass 10. To this purpose, the film 1 may be comprised of any material commonly used for forming linear light polarizers. In particular, it may be polyvinyl alcohol-based, with light-absorbing molecules incorporated therein and oriented along a defined direction. For example, the oriented molecules may be iodine. The linear light-polarizing direction of the film 1 is then the linear polarization direction of light after passing through the film 1. It is denoted LP hereafter.

The second film 2 forms a retarder plate in the second portion P2 of the optical surface of the eyeglass 10. In a known manner, a retarder film may be made of birefringent material, this birefringent material having a slow axis and a fast axis parallel to the optical surface, and perpendicular to each other. The slow axis relates to a high refractive index value, also called slow refractive index value, and the fast axis relates to a low refractive index value, also called fast refractive index value. These refractive index values apply for at least one wavelength comprised in the visible range, namely between 0.38 and 0.75 µm. In particular, the film 2 may be based on bi-axial oriented propylene, polycarbonate, polymethylmethacrylate, polyethylene, cyclic olefin copolymers, polyvinyl chloride, triacetyl cellulose (TAC), etc.

Generally for the invention, the film 2 acts as a retarder plate in the second portion P2 of the optical surface for light passing through the film 2, but it has a retarder efficiency out of the surface portion P2 which is lower than within this surface portion P2. In a known manner, a retarder plate transmits light which is linearly-polarized along the slow axis with a propagation delay with respect to light which is linearly-polarized along the fast axis, for a common light wavelength possibly between 0.38 and 0.75 µm. The propagation delay produced by the retarder between both polarization directions depends on the thickness of the retarder plate, measured along the propagation direction, i.e. direction perpendicular to the optical surface of the eyeglass 10. The retarder plate is then called quarterwave plate, halfwave plate or three-quarterwave plate, if the delay induces a phase difference which equals a quarter, a half or three quarters of the time period of the light-wave in the air, respectively.

In preferred embodiments of the invention, the first portion P1 of the optical surface out of the second portion P2 may be devoid of retarder efficiency produced by the film 2. This may be implemented by limiting the film 2 provided with retarder efficiency to the inside of the surface portion P2. Another possibility is that the film 2 extends continuously over the whole surface portion P1 but has retarder efficiency only within the surface portion P2, and zero- or much reduced retarder efficiency out of the surface portion P2. A process for producing such film 2 with retarder efficiency limited to within the surface portion P2 will be described later below.

Optionally, a transparent protective layer 3 which is also comprised in the eyeglass 10, may be arranged on a side of the film 2 which is opposite from the film 1. The layer 3 may be comprised of a sheet of any material suitable for providing the protection function. For example, the layer 3 may be polycarbonate-based, polyethylene-based, polyimide-based, triacetyl cellulose-based, etc. Alternatively, the transparent protective layer 3 may be made of a varnish such as those used for ophthalmic lenses to provide an anti-scratch or an impact resistant function. The layer 3 may extend over the surface portion P2 only, but preferably over the whole surface portion P1.

In case the film 2 is limited within the surface portion P2, the transparent optical element or eyeglass 10 may further comprise a complementary film 4 in the first portion P1 of the optical surface out of the second portion P2. This complementary film 4 is advantageously selected so that the element 10 has a same aspect in the second portion P2 and in the first portion P1 out of the second portion P2 when viewed from the side of the second film 2.

Preferably, the eyeglass 10 may also further comprise a transparent filler 5 which is arranged between the second film 2 and the complementary film 4, along at least part of the peripheral boundary B. Such transparent filler 5 may be made of a varnish in several easy-to-manufacture implementations.

The protective layer 3 and the complementary film 4 may be implemented independently of each other, and the complementary film 4 may be implemented with or without the filler 5. For element structures of concern, one or several of the following improvements may be implemented separately or in combination:

- the transparent protective layer 3 may be arranged on both the film 2 and the complementary film 4, opposite the film 1;

the transparent filler 5 may be comprised of an extension of the transparent protective layer 3 which fills a gap between the film 2 and the complementary film 4, in particular when the layer 3 is made out of varnish;

respective refractive index values of the complementary film 4 and the possible transparent filler 5 may be comprised between 0.9 and 1.1 times a mean value of the slow and fast refractive index values of the second film 2, for a wavelength between 0.38 and 0.75 µm. Thus, light reflection on the front surface of the eyeglass does not significantly vary between inside and outside the surface portion P2. Put another way, the boundary B is not much visible for an observer located in front of the front face of the eyeglass, so that the eyeglass 10 is aesthetic; and respective refractive index values of the transparent protective layer 3 and the complementary film 4 may be comprised between 0.9 and 1.1 times a mean value of the slow and fast refractive index values, for a wavelength between 0.38 and 0.75 µm. Thus, light reflection on the front surface of the eyeglass 10 is not significantly increased due to the layer 3 and film 4.

Figure 3:
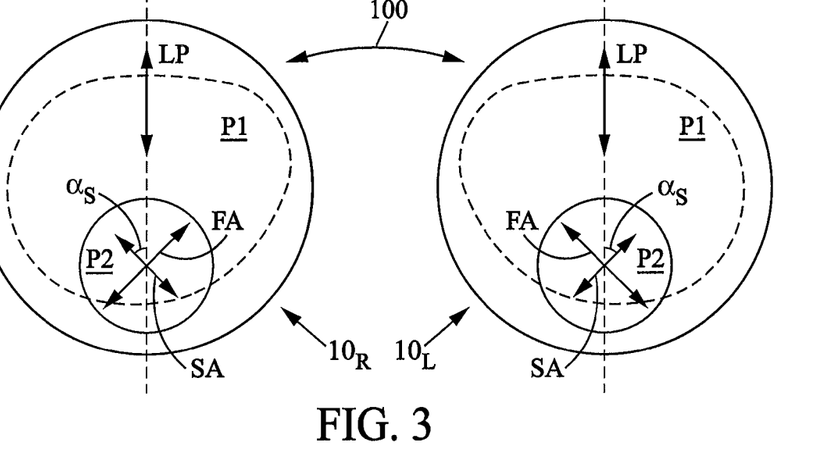
FIG. 3 is a plan view of a set of paired eyeglasses suitable for a preferred application of the invention.

Referring to any one of the eyeglasses $10_R$ and $10_L$ of FIG. 3, more preferred relative orientations of the film 1 with linear light-polarizing function and the film 2 with retarder function are now described.

Preferably, when the film 2 comprises a film of a birefringent material, it may be oriented so that the polarization direction LP of light transmitted through the film 1 is angularly offset with respect to each of the slow axis SA and fast axis FA with more than 5 degrees, or better more than 10 degrees. Thus, the film 2 appears to be efficient in addition to the film 1, so that the combination of both films 1 and 2 in the second surface portion P2 acts as a selector of elliptically polarized light among an externally imposed polarized light beam which impinges on the front surface of the eyeglass 10.

More preferably, an angle $\alpha_S$ between the polarization direction LP of light transmitted through the film 1 and the slow axis SA may be comprised between 35 and 55 degrees, or between 125 and 145 degrees, in absolute value.

In addition, a thickness of the film 2 may be such that this film is a quarterwave plate for at least one wavelength comprised between 0.38 and 0.75 µm. Then, the combination of both films 1 and 2 in the second surface portion P2 acts as a selector of almost circularly polarized light for the beam of light with an externally imposed polarization impinging on the front surface of the eyeglass 10. More exact selection of circularly polarized light is obtained when the angle $\alpha_S$ is comprised between 40 and 50 degrees, or between 130 and 140 degrees, in absolute value. This means that the polarization direction LP of light transmitted through the first film 1 is angularly offset with respect to each of the slow axis SA and the fast axis FA with more than 40 degrees. Most preferably, the angle $\alpha_S$ may be 45 degrees or 135 degrees.

For applications where an elliptical polarization of the light impinging on the front surface is to be selected, excluding any circular polarization, the angle $\alpha_S$ may be comprised between 0 and 45 degrees excluded or, more preferably, between 10 and 35 degrees included, or between 55 and 80 degrees, or between 100 and 125 degrees, or between 145 and 170 degrees, in absolute value. Then, the eyeglass 10 within the surface portion P2 is adapted to select a first elliptical polarization of light with respect to a second elliptical polarization which is orthogonal to the first one in the polarization space.

Again when the polarization direction LP of the light which is transmitted through the film 1 is angularly offset with respect to each of the slow axis SA and the fast axis FS with more than 10 degrees, the thickness of the film 2 may be such that this film 2 is not a quarterwave, a halfwave or a three-quarterwave retarder plate for at least one wavelength comprised between 0.38 and 0.75 µm. Preferably, the thickness of the film 2 may be selected so that the film 2 is not a quarterwave, a halfwave or a three-quarterwave retarder plate for any wavelength which is comprised between 0.38 and 0.75 µm. Thus such a lens may use a 45° angle, in particular for better compromise for having the most contrast with most orientation of linearly polarized light-rays, without blocking any circularly polarized light rays, in particular in case one looks at a digital screen which is covered by its own quarter-wave-plate, such as being the case for some smartphones.

In all cases, the eyeglass 10 selects the linear polarization which is parallel to the direction LP for light impinging on the front surface in the surface portion P1 out of the surface portion P2. Thus, the eyeglass 10 performs two different polarization selections depending on the light-ray impinging location within the surface portion P1.

FIG. 3 represents a set of paired eyeglasses comprised of a right eyeglass $10_R$ and a left eyeglass $10_L$, each of which is in accordance with one of the invention embodiments just described. Reference number 100 denotes the eyeglass pair as a whole. In particular, for each one of the eyeglasses $10_R$ and $10_S$, the angle $\alpha_S$ between the polarization direction LP of light transmitted through the film 1 and the slow axis SA may be comprised between 35 and 55 degrees, or between 125 and 145 degrees, in absolute value. Then, the angle $\alpha_S$ for the right eyeglass $10_R$ may be selected for forming a right-hand circular polarization filter, and the angle $\alpha_S$ for the left eyeglass $10_L$ may be selected for forming a left-hand circular polarization filter. Thus, both eyeglasses $10_R$ and $10_L$ select a different one of the two circular light polarizations in their respective surface portions P2. Right/left-hand circular polarization refers to the rotation direction of the electrical field contained in the light wave, when the light ray enters into one's eye. Such set of paired eyeglasses is then adapted for stereoscopic vision based on circular polarization selection, while providing protection against dazzling due to light reflected by horizontal surfaces out of the surface portion P2. In case the film 1 is oriented so that the direction LP is horizontal with respect to the as-worn position of the eyeglasses, the portions P2 of the eyeglasses $10_R$ and $10_S$ provide protection against dazzling due to light reflected by vertical surfaces, in addition to allowing stereoscopic vision based on circular polarization selection.

Figure 4A:
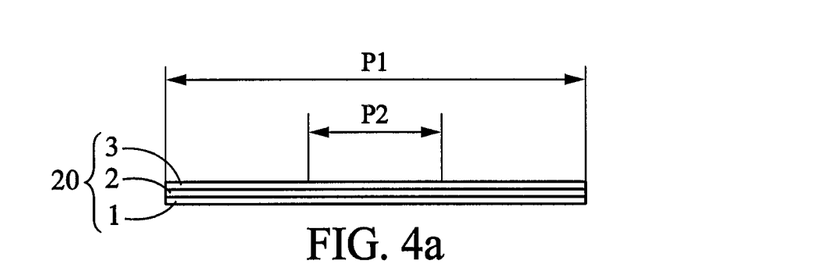
FIGS. 4a to 4c are cross-sectional views of transparent optical elements corresponding to three other embodiments of the invention.
Figure 4B:
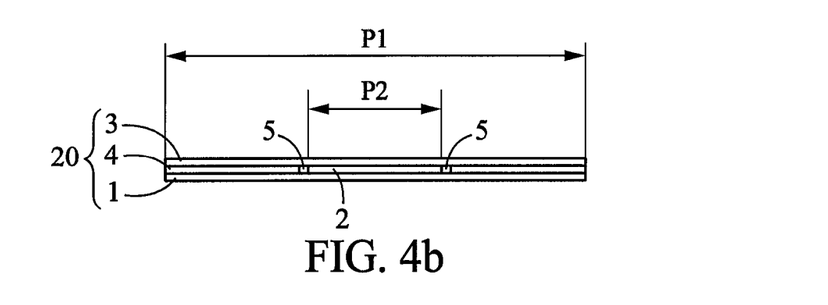
Figure 4C:
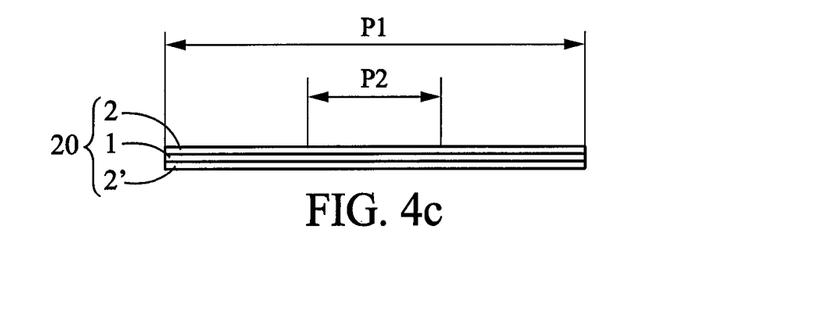

FIGS. 4a to 4c represent other embodiments of the invention, where the transparent optical element is a layered structure adapted for being laminated on an eyeglass. The structures are denoted 20 and comprises the first film 1, the second film 2, and optionally the protection film 3 (FIG. 4a), the complementary film 4 and possibly the filler 5 (FIG. 4b). The relative configuration of the films 1 and 2 in FIG. 4a is similar to that in the eyeglass 10 of FIG. 2a, and the configuration in FIG. 4b is similar to that of FIG. 2c, with same reference numbers denoting same components. The layered structure 20 of FIG. 4c comprised the films 1 and 2, and an additional film 2' which may be similar to the film 2. Possibly, the film 2' may have a retarder efficiency within the surface portion P2, similar to the film 2. The film 1 is located between the films 2 and 2' in the layered structure 20 of FIG. 4c. This structure enables two kinds of advantages. First, it is compatible with some polarized films which arrive already covered on both sides by TAC films, and the TAC films can be changed into birefringent films using the process described below. Then, having both TAC films birefringent makes it possible that the birefringent layer is always before the linear polarized layer whatever position the film is placed on the ophthalmic lens and whatever the direction of the light-ray through the eyeglass.

As another embodiment, the protective layer 3, and/or the film 2, and/or the complementary film 4, and/or the filler 5 and/or an additional film might be tinted, or photochromic.

In a further embodiment, the film 2, coupled with those present of the complementary film 4, the filler 5 and the protective layer 3, may be laminated together on the eyeglass substrate.

This lamination may be permanent or performed so as to be temporary.

In the case film 2 is permanently laminated on the eyeglass, adhesive such as pressure sensitive adhesives (PSA), hot melt adhesive (HMA), etc, could be used.

In the case film 2 is temporarily on the eyeglass, one may use a weak glue, pressure sensitive adhesives, moisture, water, or any other known technique that enables to stick temporary patches on an eyeglasses.

Several processes are now described for manufacturing a transparent optical element according to the invention. The layered structure of FIG. 4a or 4c is used as an example for describing such processes. The key step of these processes is a heating step which provides the film 2 with final birefringence efficiency higher in the surface portion P2 as compared to the surface portion P1 out of the surface portion P2. To this purpose, at least one of a heating duration, a maximum heating temperature and a cooling rate is different within the portion P2 from the corresponding value outside of this portion P2.

Figure 5A:
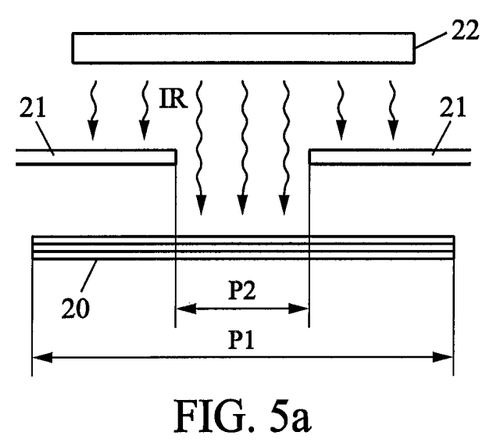
FIG. 5a illustrates a process step for manufacturing a transparent optical element as represented in FIG. 4a or 4c.

As shown in FIG. 5a, the layered structure 20 may be exposed to a heat source 22 while using a heat mask 21 which is interposed between the heat source 22 and the structure 20 during the heating step. The heat mask 21 has heat transmission values which are different in the portion P2 and in the portion P1 out of the portion P2.

Figure 5B:
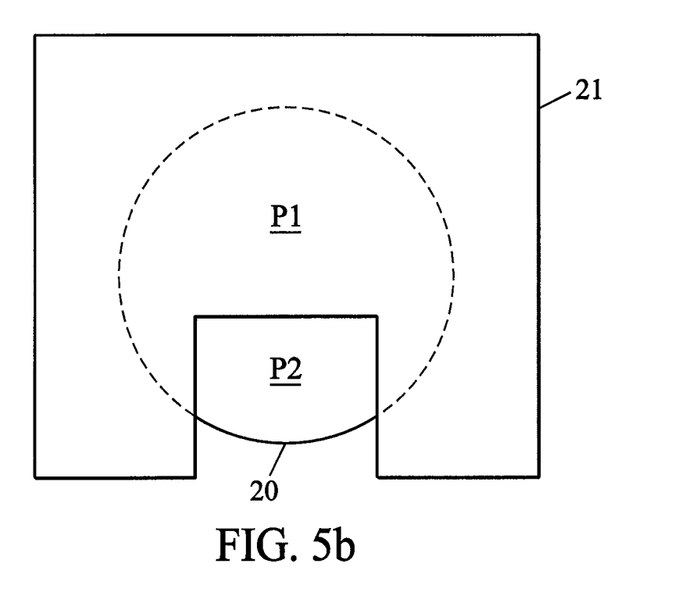

When the film 2 is not initially birefringent, birefringence efficiency may be produced in the surface portion P2 by generating stretching in this portion. For example, the heat mask 21 represented in FIG. 5b is designed for occulting the layered structure 20 out of the surface portion P2 but exposing the surface portion P2 to the IR radiation originating from the heat source 22. Thus, the layered structure 20 is raised up to temperature higher in the portion P2 as compared to out of the portion P2. It becomes then softer in the portion P2, and can thus be stretched so that stretching is mainly located within the portion P2 and preferably more important along an axis than along another axis. As a consequence of this stretching, the film 2 exhibits increased birefringence efficiency in the portion P2 with respect to the portion P1 out of the portion P2. The layered structure 20 may be stretched using several devices known in the art. For example, the peripheral edge of the layered structure 20 may be secured to a rigid frame, and a stamp is forced against the layered structure 20 on one side of this latter. Due to the higher temperature of the layered structure 20 within the portion P2, stretching so-produced and resulting birefringence efficiency are mainly contained within the portion P2.

Figure 5C:
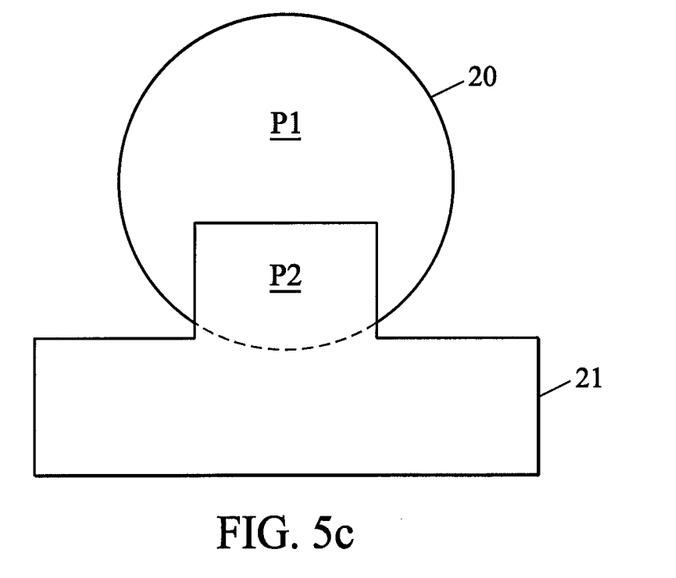

Another process suits when the film 2 is initially birefringent in the whole surface portion P1, and the birefringence efficiency can be relaxed upon heating. FIG. 5c represents another heat mask 21 which can be used in combination with the heating device of FIG. 5a, so as to heat the film 2 in the surface portion P1 only outside the surface portion P2. Thus birefringence efficiency becomes reduced in the portion P1 out of the portion P2, with respect to this latter portion.

Actually, the processes just described may be applied equivalently to the layered structure as illustrated in FIG. 4a, including the protection layer 3 or without this layer 3, but they may also be applied to the film 2 alone before it is laminated with the film 1. They may also be applied to a multilayered structure which comprises two second films 2 and 2' in addition to the film 1, with the film 1 being arranged between both films 2 and 2' within the multilayered structure 20 as shown in FIG. 4c. In particular, the two second films 2 and 2' may both be out of polyethylene.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A set of paired eyeglasses comprising:
   right and left eyeglasses suitable for being assembled in a spectacle frame, at least one of said right and left eyeglasses being a finished or semi-finished ophthalmic eyeglass and forming a transparent optical element with dual light-polarizing effect, the element having an optical surface and including:
   at least first and second films each arranged in parallel with said optical surface,
   the first film forming a linear light-polarizer in a first portion of the optical surface; and
   the second film forming a retarder plate in a second portion of the optical surface; wherein:
      within the optical surface, the second portion is smaller than the first portion and is contained within said first portion, and a retarder efficiency of the second film is higher in the second portion with respect to the first portion out of said second portion,
      said element includes a base eyeglass,
      at least one of the first film and the second film is present inside the base eyeglass, or the first and second films are laminated on the base eyeglass,
      the second film is situated before the first film at least in the second portion of the optical surface, along light rays entering, through the eyeglass, into an eye of a wearer of the eyeglass,
      the second film comprises, in the second portion of the optical surface, a film of a birefringent material with a slow axis and a fast axis both parallel to the second film and perpendicular to each other,
      the second film is oriented so that a polarization direction of light transmitted through the first film is angularly offset with respect to each of the slow and fast axes by more than 5 degrees,
      the first portion of the optical surface out of the second portion is devoid of retarder efficiency produced by the second film, and
      the retarder plate has no focus power.

2. The set of paired eyeglasses according to claim 1, wherein the second film is limited within the second portion of the optical surface.

3. The set of paired eyeglasses according to claim 2, wherein the element comprises a complementary film in the first portion of the optical surface out of the second portion, said complementary film being selected so that the transparent optical element has a same aspect in the second portion and in the first portion out of the second portion when viewed from a side of the second film.

4. The set of paired eyeglasses according to claim 3, wherein the element comprises a transparent filler arranged between the second film and the complementary film, along at least part of a peripheral boundary of the second portion of the optical surface.

5. The set of paired eyeglasses according to claim 4, wherein:
the birefringent material of the second film in the second portion of the optical surface has a slow refractive index value and a fast refractive index value for at least one wavelength comprised between 0.38 and 0.75 µm, and
refractive index values of the complementary film and the transparent filler for said wavelength are comprised between 0.9 and 1.1 times a mean value of the slow and fast refractive index values.

6. The set of paired eyeglasses according to claim 4, wherein the transparent filler is made of a varnish.

7. The set of paired eyeglasses according to claim 3, wherein the element comprises a transparent protective layer arranged on both the second film and the complementary film, opposite the first film.

8. The set of paired eyeglasses according to claim 7, wherein:
the birefringent material of the second film in the second portion has a slow refractive index value and a fast refractive index value for at least one wavelength comprised between 0.38 and 0.75 µm, and
refractive index values of the transparent protective layer and the complementary film for said wavelength are comprised between 0.9 and 1.1 times a mean value of the slow and fast refractive index values.

9. The set of paired eyeglasses according to claim 7, wherein the transparent protective layer is made of a varnish.

10. The set of paired eyeglasses according to claim 1, wherein the second film extends continuously over the whole first portion of the optical surface, and the retarder efficiency of said second film in the first portion of the optical surface out of the second portion is lower than the retarder efficiency of said second film in said second portion of the optical surface.

11. The set of paired eyeglasses according to claim 10, wherein the element comprises a transparent protective layer arranged on a side of the second film opposite the first film.

12. A process for manufacturing the set of paired eyeglasses according to claim 10, comprising a heating step of the second film using heating parameters of at least one of a heating duration, a maximum heating temperature and a cooling rate, which are different in values in the second portion of the optical surface and in the first portion out of said second portion, so that a difference between the retarder efficiencies of the second film respectively in the second portion of the optical surface and in the first portion out of said second portion, is enabled by said heating parameters.

13. A process according to claim 12, using a heat mask interposed between a heat source and the second film during the heating step, said heat mask having heat transmission values which are different in the second portion of the optical surface and in the first portion out of said second portion.

14. A process according to claim 12, wherein the first film and the second film are both comprised in a multilayered structure, and the heating step is applied to the multilayered structure.

15. A process according to claim 12, wherein the second film is heated and stretched in the second portion of the optical surface mainly along a given axis with regard to another axis, so as to provide said second film with an increased birefringence efficiency in said second portion with respect to the first portion of the optical surface out of said second portion.

16. A process according to claim 12, wherein the second film is initially birefringent in the whole first portion of the optical surface, and wherein said second film is heated in said first portion out of the second portion so that a birefringence efficiency becomes reduced in said first portion out of said second portion with respect to said second portion.

17. The set of paired eyeglasses according to claim 1, wherein a shape of a peripheral boundary of the second portion of the optical surface is circular, oval, rectangular or of inverted U-shape.

18. The set of paired eyeglasses according to claim 1, wherein the polarization direction of light transmitted through the first film is angularly offset with respect to each of the slow and fast axes with more than 10 degrees.

19. The set of paired eyeglasses according to claim 18, wherein an angle between the polarization direction of light transmitted through the first film and the slow axis is comprised between 35 and 55 degrees, or between 125 and 145 degrees, in absolute value, meaning that the polarization direction of light transmitted through the first film is angularly offset with respect to each of the slow and fast axes with more than 35 degrees.

20. The set of paired eyeglasses according to claim 19, wherein a thickness of the second film is such that the second film is a quarterwave plate for at least one wavelength comprised between 0.38 and 0.75 µm.

21. The set of paired eyeglasses according to claim 19, wherein the angle between the polarization direction of light transmitted through the first film and the slow axis is comprised between 40 and 50 degrees, or between 130 and 140 degrees, in absolute value, meaning that the polarization direction of light transmitted through the first film is angularly offset with respect to each of the slow and fast axes with more than 40 degrees.

22. The set of paired eyeglasses according to claim 18, wherein an angle between the polarization direction of light transmitted through the first film and the slow axis is comprised between 10 and 35 degrees, or between 55 and 80 degrees, or between 100 and 125 degrees, or between 145 and 170 degrees, in absolute value.

23. The set of paired eyeglasses according to claim 18, wherein a thickness of the second film is such that the second film is not a quarterwave, a halfwave or a three-quarterwave retarder plate for at least one wavelength comprised between 0.38 and 0.75 µm.

24. The set of paired eyeglasses according to claim 1, wherein at least one of the first film and the second film is present inside the base eyeglass, and the second portion of the optical surface is located in a lower part of the eyeglass, with reference to an orientation of said eyeglass as worn by a standing wearer.

25. A transparent optical element according to claim 1, wherein the first and second films are laminated on the base eyeglass, and the second portion of the optical surface is located in a lower part of the eyeglass, with reference to an orientation of said eyeglass as worn by a standing wearer.

26. The set of paired eyeglasses according to claim 25, wherein the second portion of the optical surface contains a focal point of the eyeglass for near vision and excludes a focal point of the eyeglass for far vision.

27. The set of paired eyeglasses according to claim 25, wherein the first and second films are laminated on a front surface of the base eyeglass, with respect to the orientation of the eyeglass as worn by a wearer, and the first film is closer to the base eyeglass than the second film.

28. The set of paired eyeglasses according to claim 1, wherein:
    each one of the right and left eyeglasses includes a transparent optical element with dual light-polarizing effect, the element having an optical surface and including at least first and second films each arranged in parallel with said optical surface, the first film forming a linear light-polarizer in a first portion of the optical surface, the second film forming a retarder plate in a second portion of the optical surface;
    within the optical surface, the second portion is smaller than the first portion and is contained within said first portion;
    a retarder efficiency of the second film is higher in the second portion with respect to the first portion out of said second portion;
    the second film comprises in the second portion of the optical surface, a film of a birefringent material with a slow axis and a fast axis both parallel to the second film and perpendicular to each other;
    the second film is oriented so that a polarization direction of light transmitted through the first film is angularly offset with respect to each of the slow and fast axes with more than 5 degrees;
    an angle between the polarization direction of light transmitted through the first film and the slow axis is comprised between 35 and 55 degrees, or between 125 and 145 degrees, in absolute value, meaning that the polarization direction of light transmitted through the first film is angularly offset with respect to each of the slow and fast axes with more than 35 degrees; and
    for each eyeglass the second film is situated before the first film at least in the second portion of the optical surface along light rays entering into an eye of a wearer of the eyeglass.

29. The set of paired eyeglasses according to claim 28 wherein,
    for one of the right and left eyeglasses, an angle between the polarization direction of light transmitted through the first film and the slow axis of the second film is selected for forming a right-hand circular polarization filter, and
    for the other one of the right and left eyeglasses, the angle between the polarization direction of light transmitted through the first film and the slow axis is selected for forming a left-hand circular polarization filter,
    so that the set of paired eyeglasses is suitable for providing stereoscopic vision by circular polarization selection, in the second portions of the optical surfaces to a wearer of said set of paired eyeglasses.

30. The set of paired eyeglasses according to claim 29 wherein,
    for the right eyeglass, the angle between the polarization direction of light transmitted through the first film and the slow axis is selected for forming a right-hand circular polarization filter, and
    for the left eyeglass, the angle between the polarization direction of light transmitted through the first film and the slow axis is selected for forming a left-hand circular polarization filter.

31. A process for manufacturing a transparent optical element with dual light-polarizing effect, the method comprising:
    applying first and second films to a base eyeglass having an optical surface, each of the first and second films being arranged in parallel with said optical surface, the first film forming a linear light-polarizer in a first portion of the optical surface, the second film forming a retarder plate in a second portion of the optical surface, the second portion being smaller than the first portion and contained within said first portion, and a retarder efficiency of the second film being higher in the second portion with respect to the first portion out of said second portion; and
    heating a second film using heating parameters of at least one of a heating duration, a maximum heating temperature and a cooling rate, which are different in values in the second portion of the optical surface and in the first portion out of said second portion, so that a difference between the retarder efficiencies of the second film respectively in the second portion of the optical surface and in the first portion out of said second portion, is enabled by said heating parameters, wherein the retarder plate has no focus power.

* * * * *